(12) United States Patent
Chang

(10) Patent No.: US 9,653,122 B1
(45) Date of Patent: May 16, 2017

(54) STORAGE DEVICE CARRIER AND MOUNTING APPARATUS FOR STORAGE DEVICE

(71) Applicant: HON HAI PRECISION INDUSTRY CO., LTD., New Taipei (TW)

(72) Inventor: Chun-Wei Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/935,867

(22) Filed: Nov. 9, 2015

(30) Foreign Application Priority Data

Oct. 30, 2015 (CN) .......................... 2015 1 0717916

(51) Int. Cl.
*G06F 1/16* (2006.01)
*G11B 33/04* (2006.01)

(52) U.S. Cl.
CPC ................................ *G11B 33/0405* (2013.01)

(58) Field of Classification Search
CPC G06F 1/187; G06F 1/1658; G11B 2220/2516
See application file for complete search history.

(56) References Cited

U.S. PATENT DOCUMENTS

| | | | | |
|---|---|---|---|---|
| 4,941,841 A * | 7/1990 | Darden | .................... | G06F 1/184 361/679.39 |
| 6,122,165 A * | 9/2000 | Schmitt | ................... | G06F 1/184 361/679.31 |
| 7,634,784 B2 * | 12/2009 | Christie, Jr. | ......... | G11B 17/041 360/99.06 |
| 7,679,896 B2 * | 3/2010 | Deng | ...................... | G06F 1/187 312/223.1 |
| 8,295,053 B2 * | 10/2012 | Fujikawa | .................. | G06F 1/16 29/592.1 |
| 8,405,968 B2 * | 3/2013 | Chen | ........................ | H05K 7/14 211/26 |
| 2007/0025014 A1 * | 2/2007 | Kim | ........................ | G06F 1/187 360/97.19 |
| 2013/0099639 A1 * | 4/2013 | Hu | ........................ | G11B 33/124 312/223.2 |
| 2014/0139997 A1 * | 5/2014 | Liu | ...................... | G11B 33/124 361/679.37 |
| 2015/0029656 A1 * | 1/2015 | Lu | ........................ | G11B 33/124 361/679.39 |

* cited by examiner

*Primary Examiner* — Anthony Q Edwards
(74) *Attorney, Agent, or Firm* — Steven Reiss

(57) ABSTRACT

A storage device carrier includes a first frame and a second frame. The first frame includes two opposite sidewalls. Two through holes are defined in each of the sidewalls, for allowing screws to extend therethrough. The second frame is detachably mounted in the first frame. The second frame includes two opposite side plates. Each side plate defines two through slots for allowing screws and unthreaded fasteners to extend therethrough. When the second frame is mounted in the first frame, the side plates of the second frame respectively abut against the sidewalls of the first frame, and the through slots of the side plates respectively align with the through holes of the sidewalls. A mounting apparatus having the storage device is also provided.

13 Claims, 6 Drawing Sheets

STORAGE DEVICE CARRIER AND MOUNTING APPARATUS FOR STORAGE DEVICE

FIELD

The subject matter herein generally relates to a storage device carrier and a mounting apparatus for a storage device.

BACKGROUND

A storage device, such as a hard disk drive, is generally mounted in an electronic device through a storage device carrier. According to different customers' demands, some storage devices are required to be mounted to storage device carriers with screws, and some storage devices are required to be mounted to storage device carriers without screw. Thus, different storage device carriers are needed.

BRIEF DESCRIPTION OF THE DRAWINGS

Implementations of the present technology will now be described, by way of example only, with reference to the figures.

DETAILED DESCRIPTION

Figure 1:
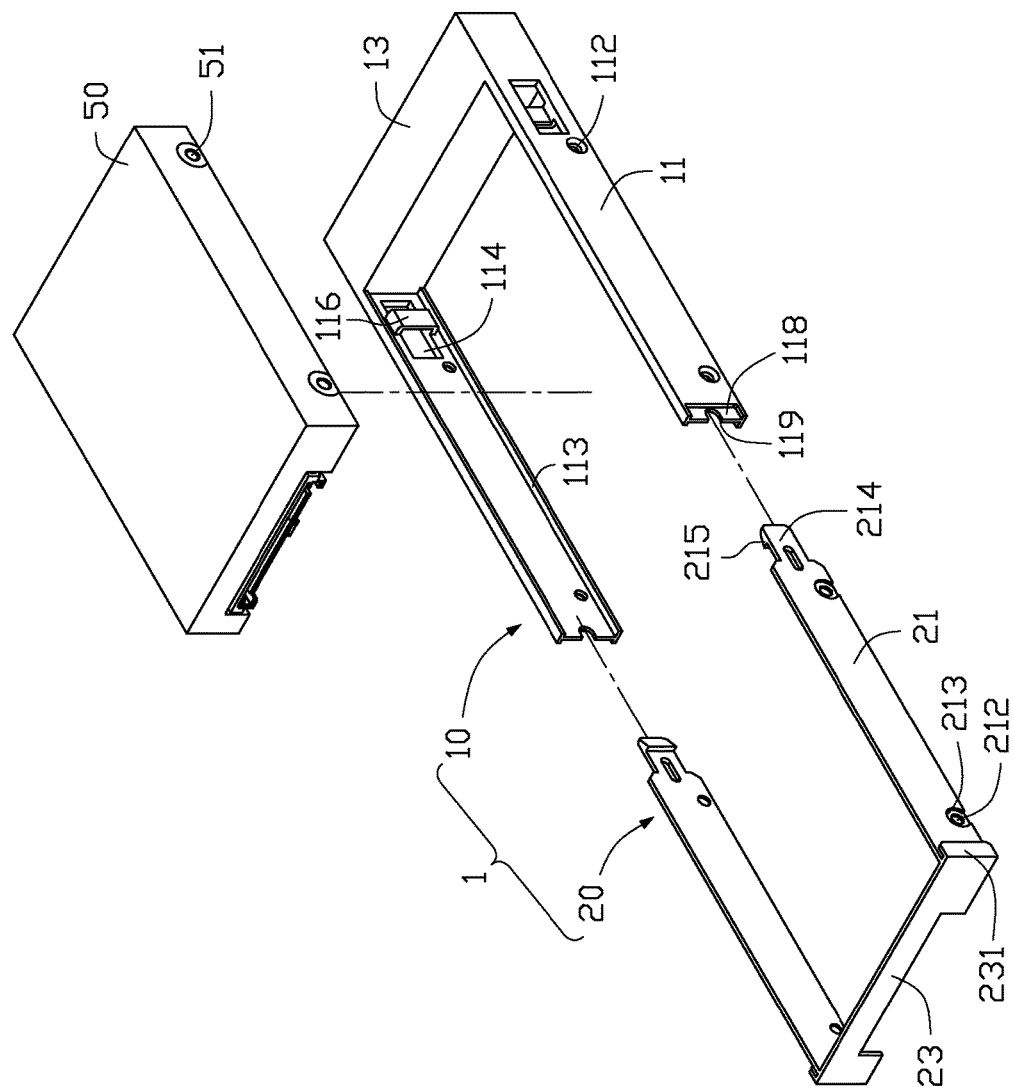
FIG. 1 is an exploded, isometric view of an embodiment of a storage device carrier and a storage device, wherein the storage device carrier includes a second frame.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure described in relation to a storage device carrier and a mounting apparatus for a storage device.

FIG. 1 illustrates an embodiment of a storage device carrier 1 for supporting a storage device 50. Two opposite sides of the storage device 50 each define two threaded holes 51. The storage device carrier 1 comprises a first frame 10 and a second frame 20.

The first frame 10 comprises two opposite sidewalls 11 and a connecting wall 13 connected between front ends of the sidewalls 11. Two spaced through holes 112 are defined in each sidewall 11. Two guiding rails 113 extend substantially perpendicular from top and bottom sides of each sidewall 11 towards the opposite sidewall 11. An opening 114 is defined in each sidewall 11 adjacent to the connecting wall 13. A substantially bridge-shaped latch 116 is connected between top and bottom sides of each opening 114 and bends towards the opposite opening 114. A recess 118 is defined in a rear end of an outer side of each sidewall 11. A latching slot 119 is defined in a rear end of each recess 118.

Figure 2:
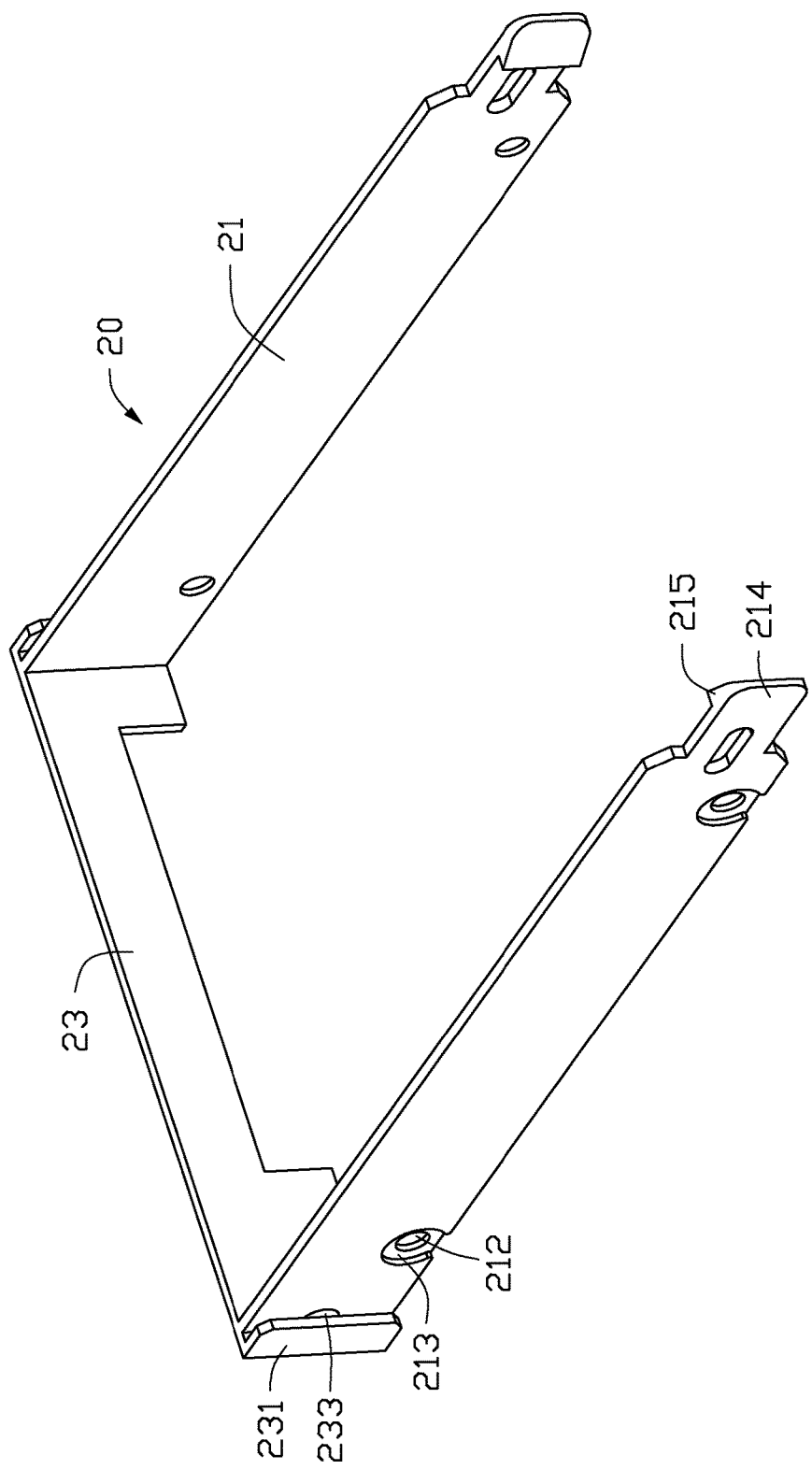
FIG. 2 is an isometric view of the second frame of FIG. 1 from another angle.

FIG. 2 illustrates that the second frame 20 comprises two opposite side plates 21 and a connecting plate 23 connected between rear ends of the side plates 21. Two spaced through slots 212 are defined in each side plate 21. Each through slot 212 is surrounded by a concave portion 213 defined in an outer side of the corresponding side plate 21. A hook 214 extends forward from a front end of each side plate 21. The hook 214 comprises a hooking portion 215 protruding inward. Opposite ends of the connecting plate 23 protrude out of the side plates 21, and extend forward to form two latching plates 231 parallel to and spaced from the side plates 21. A block 233 is coupled between each latching plate 231 and the adjacent side plate 21.

Figure 3:
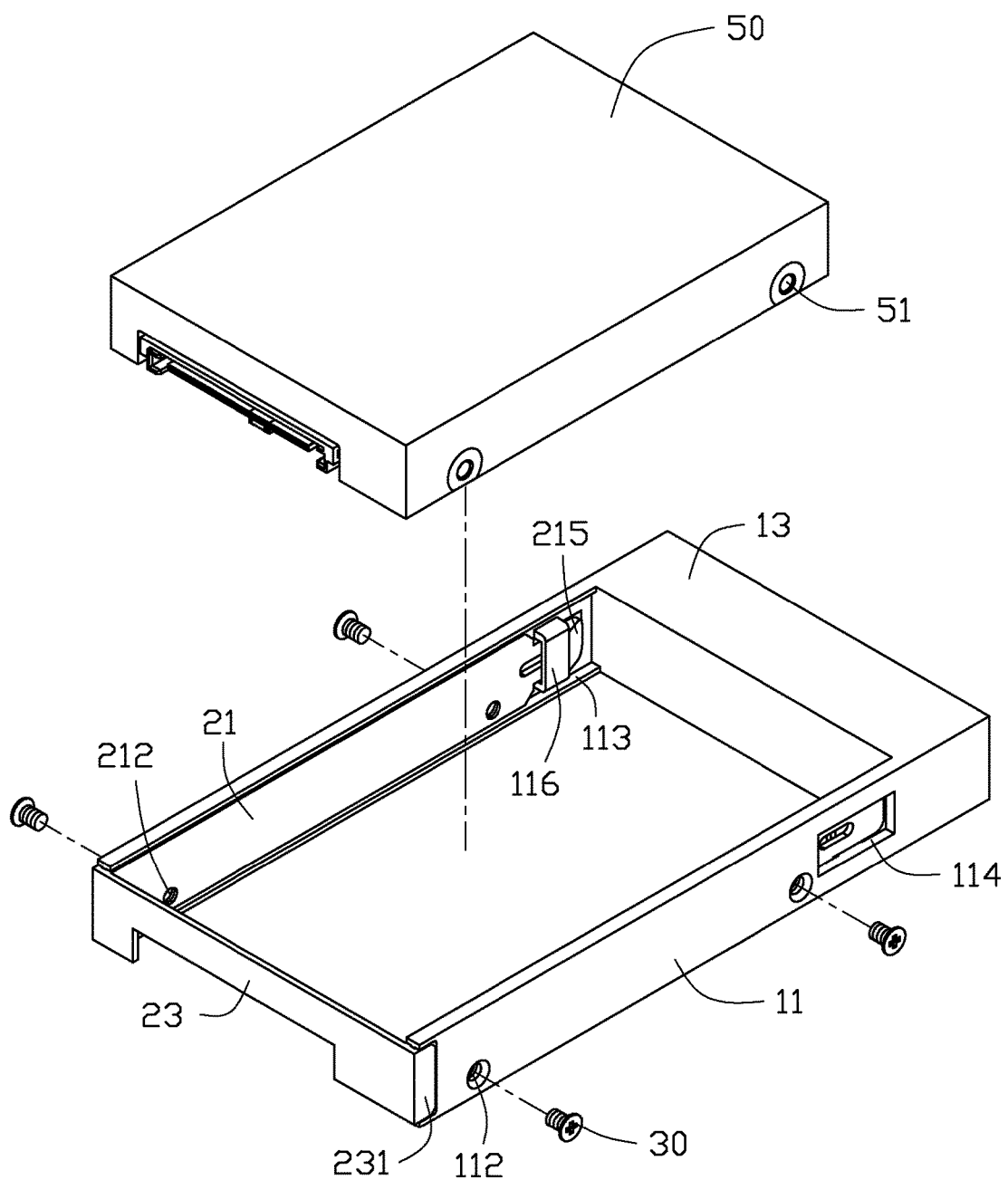
FIG. 3 is a partially assembled, isometric view of the storage device carrier, the storage device of FIG. 1, and a plurality of screws.

Referring to FIG. 3, to mount the storage device 50 with screws, the second frame 20 is inserted into the first frame 10 from a rear end of the first frame 10. Each side plate 21 of the second frame 20 is inserted into a space between the guiding rails 113 of the corresponding side wall 11. The hooks 214 slide forward along an inner side of the side walls 11, until front ends of the hooking portions 215 of the hooks 214 abut against rear ends of the latches 116, the hooks 214 deform outward to extend through the openings 114. The second frame 20 is further slid forward. When the hooking portions 215 of the hooks 214 pass over the latches 116, the hooks 214 are restored to allow the hooking portions 215 to engage with front ends of the latches 116. Thereby, the second frame 20 is mounted in the first frame 10. The latching plates 231 engage in the recesses 118, and the blocks 233 engage in the latching slots 119. The through slots 212 of the second frame 20 respectively align with the through holes 112 of the first frame 10.

Figure 4:
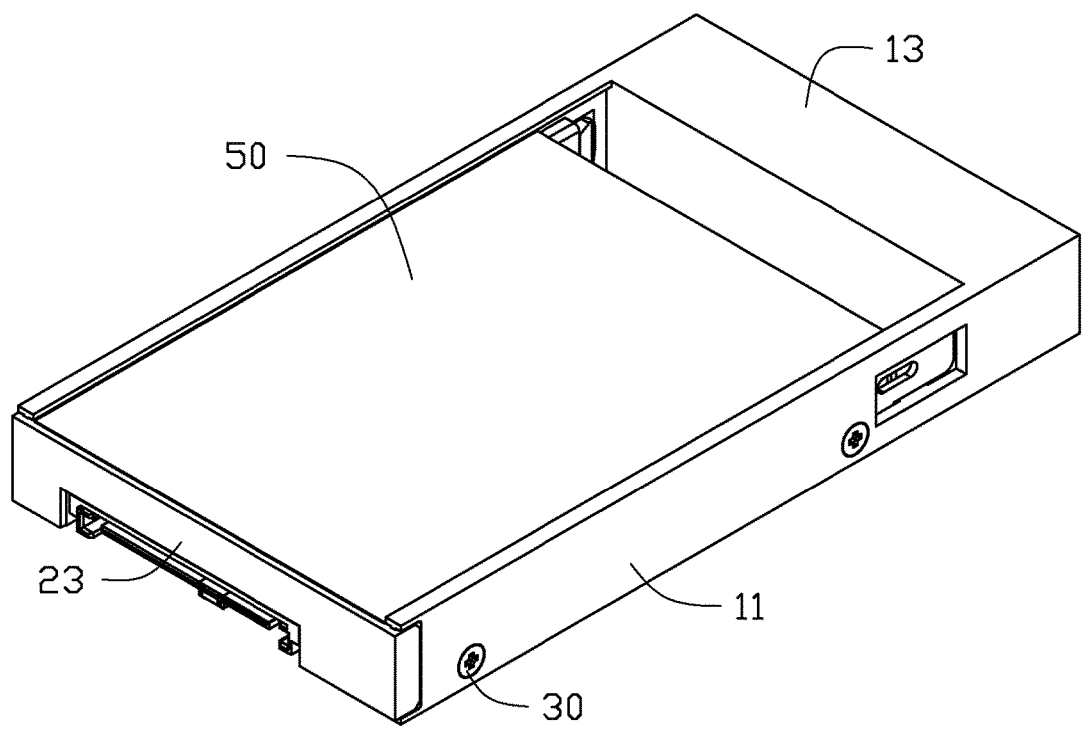
FIG. 4 is an assembled, isometric view of FIG. 3.

FIG. 4 illustrates that the storage device 50 is received in the second frame 20. The threaded holes 51 of the storage device 50 respectively align with the through slots 212 of the second frame 20. A plurality of screws 30 extend through the through holes 112 and the through slots 212, and engage in the threaded holes 51 of the storage device 50. Thereby, the storage device 50 is mounted to the storage device carrier 1 through screws.

Figure 5:
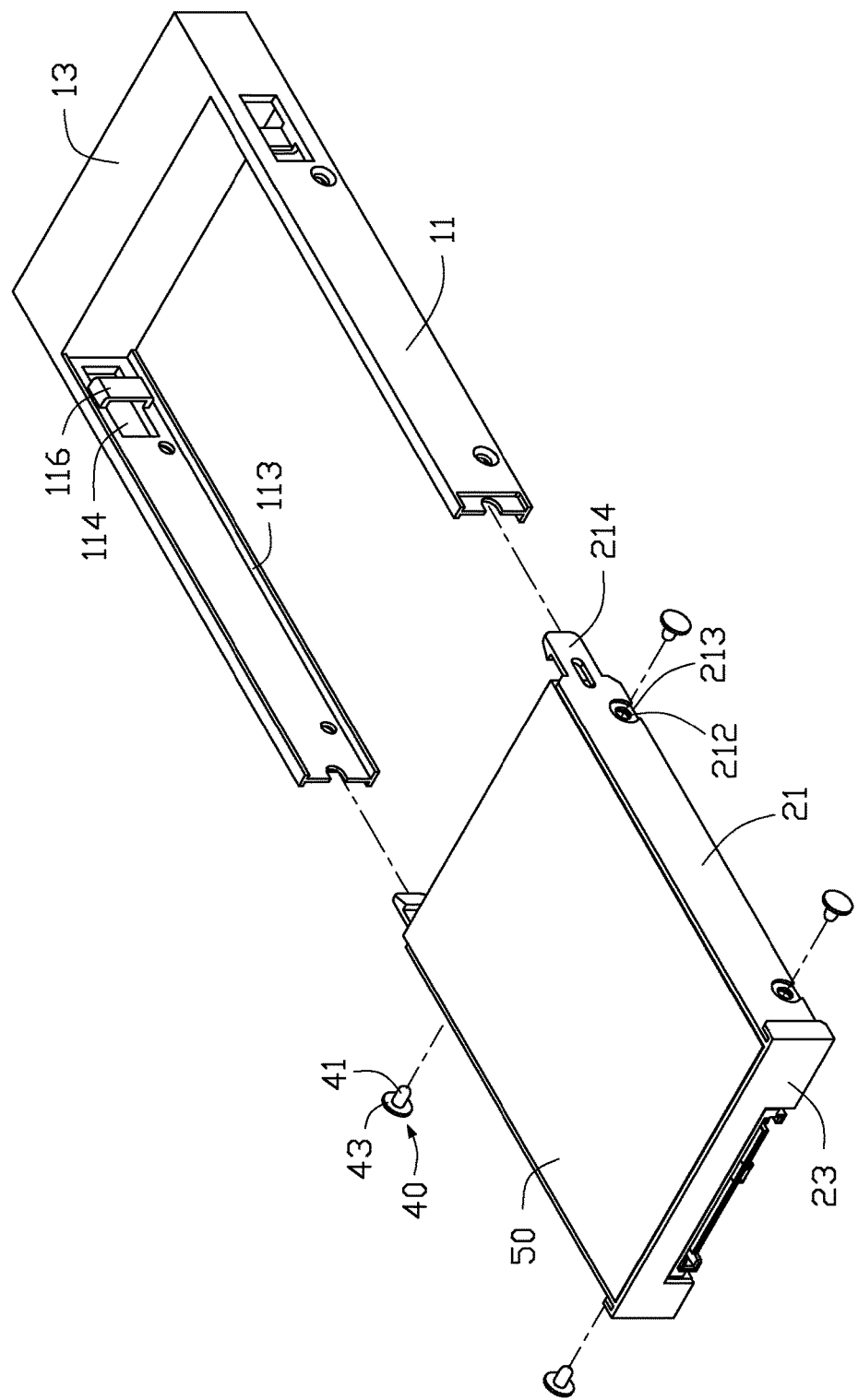
FIG. 5 is a partially assembled, isometric view of the storage device carrier, the storage device of FIG. 1, and a plurality of fasteners.

Referring to FIG. 5, to mount the storage device 50 without screw, the storage device 50 is received in the second frame 20. A plurality of unthreaded fasteners 40, such as substantially T-shaped pins, is provided. Each unthreaded fastener 40 comprises a head 43 and a post 41 extending from a middle portion of a side of the head 43. The posts 41 of the unthreaded fasteners 40 extend through the through slots 212 of the second frame 20, and engage in the threaded holes 51 of the storage device 50. The heads 43 of the unthreaded fasteners 40 are received in the concave portions 213 of the side plates 21.

Figure 6:
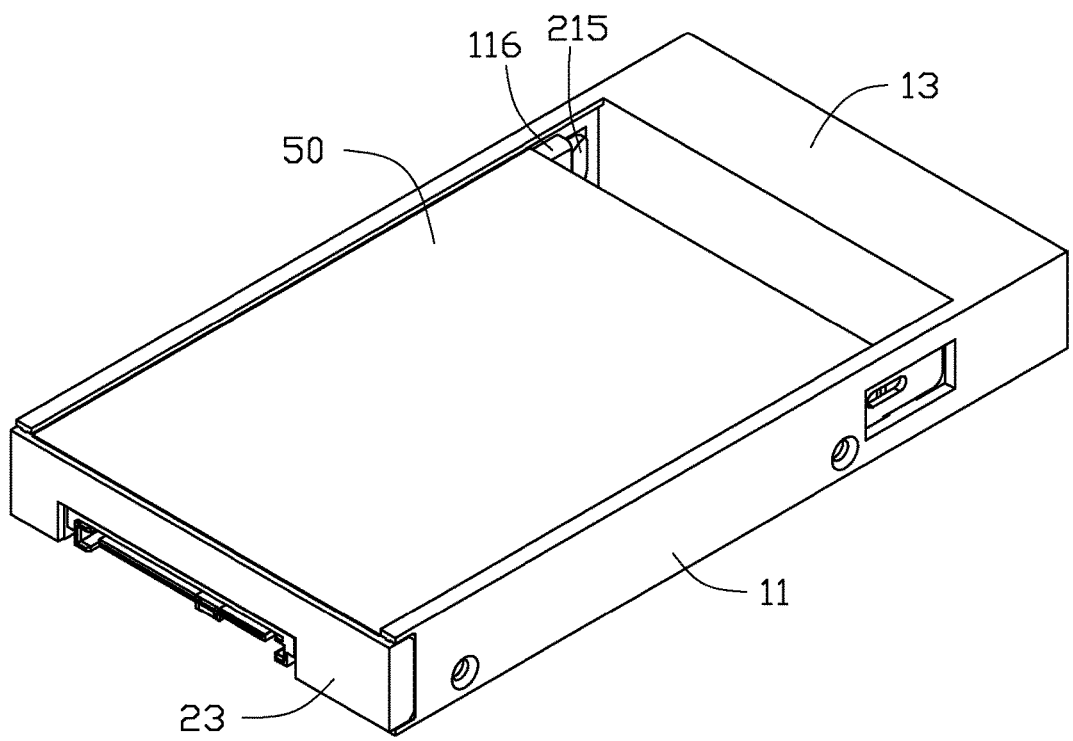
FIG. 6 is an assembled, isometric view of FIG. 5.

FIG. 6 illustrates that the second frame 20 and the storage device 50 are inserted into the first frame 10 from the rear end of the first frame 10. Each side plate 21 of the second frame 20 is inserted into the space between the guiding rails 113 of the corresponding side wall 11. The hooks 214 slide forward along the inner side of the side walls 11, until front ends of the hooking portions 215 of the hooks 214 abut against rear ends of the latches 116, the hooks 214 deform outward to extend through the openings 114. The second frame 20 and the storage device 50 are further slid forward. When the hooking portions 215 of the hooks 214 pass over the latches 116, the hooks 214 are restored to allow the hooking portions 215 to engage with front ends of the latches 116. Thereby, the second frame 20 and the storage device 50 are mounted in the first frame 10. The latching plates 231 engage in the recesses 118, and the blocks 233 engage in the latching slots 119. The sidewalls 11 of the first frame 10 cooperate with the concave portions 213 of the side plates 21 to sandwich the heads 43 of the unthreaded fasteners 40, to prevent the unthreaded fasteners 40 from loosening.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A storage device carrier comprising:
    a first frame comprising two opposite sidewalls, wherein two through holes are defined in each of the sidewalls, for allowing screws to extend therethrough; and
    a second frame detachably mounted in the first frame and comprising two opposite side plates, each of the two opposite side plates defining two through slots for allowing screws and unthreaded fasteners to extend therethrough, wherein when the second frame is mounted in the first frame, the side plates of the second frame respectively abut against the sidewalls of the first frame, and the through slots of the side plates respectively align with the through holes of the sidewalls;
    wherein a recess is defined in a rear end of each sidewall, a latching plate is coupled to and spaced from a rear end of each side plate, when the second frame is mounted in the first frame, the latching plates respectively engage in the recesses and receive a part of each sidewall between the side plate and the latching plate.

2. The storage device carrier of claim 1, wherein two guiding rails extend inward from top and bottom sides of each sidewall, when the second frame is mounted in the first frame, each side plate of the second frame is received between the guiding rails of the corresponding sidewall.

3. The storage device carrier of claim 1, wherein an opening is defined in a front end of each sidewall, a substantially bridge-shaped latch is connected between top and bottom sides of each opening, a hook extend forward from a front end of each side plate, when the second frame is mounted in the first frame, the hooks of the second frame engage with front ends of the latches of the first frame.

4. The storage device carrier of claim 3, wherein the recess is defined in the rear end of an outer side of each sidewall, and the latching plate is coupled to and spaced from the rear end of an outside of each side plate.

5. The storage device carrier of claim 1, wherein a latching slot is defined in a rear end of each recess, a block is connected between each latching plate and the corresponding side plate, when the second frame is mounted in the first frame, the blocks respectively engage in the latching slots.

6. The storage device carrier of claim 1, wherein a connecting wall is connected between front ends of the sidewalls of the first frame, and a connecting plate is connected between rear ends of the side plates of the second frame.

7. The storage device carrier of claim 1, wherein a concave portion is defined in an outer side of each side plate surrounding each through slot in the side plate, for sandwiching a head of an unthreaded fastener extending through the through slot together with the adjacent sidewall of the first frame.

8. A mounting apparatus for a storage device, comprising:
    a storage device carrier comprising:
        a first frame comprising two opposite sidewalls, wherein two through holes are defined in each of the sidewalls; and
        a second frame detachably mounted in the first frame and comprising two opposite side plates, each of the two opposite side plates defining two through slots;
    a plurality of screws, wherein when the second frame is mounted in the first frame, the through slots of the side plates respectively align with the through holes of the sidewalls, the screws are capable of extending through the through holes and the through slots, for engaging in the storage device; and
    a plurality of unthreaded fasteners, each unthreaded fastener comprising a head and a post extend from the head, when the second frame is out of the first frame, the posts of the unthreaded fasteners are capable of extending through the through slots and engaging in the storage device, the second frame is mounted in the first frame, the heads of the unthreaded fasteners are sandwiched between the side plates of the second frame and the adjacent sidewalls of the first frame,
    wherein an opening is defined in a front end of each sidewall, a substantially bridge-shaped latch is connected between top and bottom sides of each opening, a hook extends forward from a front end of each side plate, when the second frame is mounted in the first frame, the hooks of the second frame engage with front ends of the latches of the first frame.

9. The mounting apparatus of claim 8, wherein two guiding rails extend inward from top and bottom sides of each sidewall, when the second frame is mounted in the first frame, each side plate of the second frame is received between the guiding rails of the corresponding sidewall.

10. The mounting apparatus of claim 8, wherein a recess is defined in a rear end of an outer side of each sidewall, a latching plate is coupled to and spaced from a rear end of an outside of each side plate, when the second frame is mounted in the first frame, the latching plates respectively engage in the recesses.

11. The mounting apparatus of claim 10, wherein a latching slot is defined in a rear end of each recess, a block is connected between each latching plate and the corresponding side plate, when the second frame is mounted in the first frame, the blocks respectively engage in the latching slots.

12. The mounting apparatus of claim 8, wherein a connecting wall is connected between front ends of the sidewalls of the first frame, and a connecting plate is connected between rear ends of the side plates of the second frame.

13. The storage device carrier of claim 8, wherein a concave portion is defined in an outer side of each side plate surrounding each through slot in the side plate, for receiving the head of the corresponding unthreaded fastener.

\* \* \* \* \*